April 9, 1940.

J. S. TROYER

Re. 21,421

HARVESTER THRESHER

Original Filed Dec. 16, 1935

4 Sheets-Sheet 1

INVENTOR

J. S. Troyer

BY A. S. Knob

ATTORNEY

April 9, 1940. J. S. TROYER Re. 21,421

HARVESTER THRESHER

Original Filed Dec. 16, 1935 4 Sheets-Sheet 2

INVENTOR
J. S. Troyer
BY A. S. Troy
ATTORNEY

April 9, 1940.

J. S. TROYER

HARVESTER THRESHER

Original Filed Dec. 16, 1935

Re. 21,421

4 Sheets-Sheet 3

INVENTOR

J. S. Troyer

BY A. S. Kroh

ATTORNEY

April 9, 1940.
J. S. TROYER
HARVESTER THRESHER
Original Filed Dec. 16, 1935
Re. 21,421
4 Sheets-Sheet 4
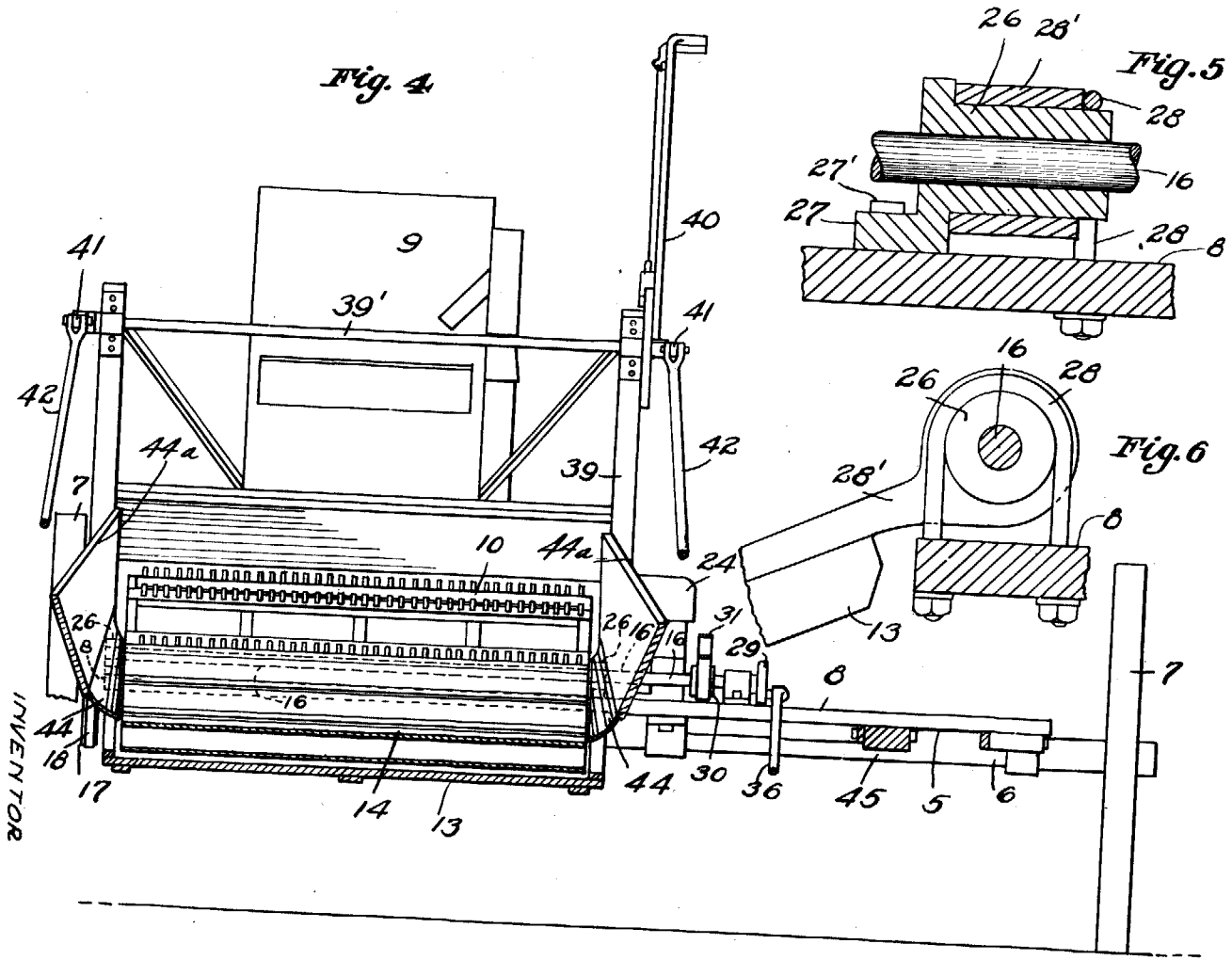
INVENTOR
J. S. Troyer
BY A. S. Knob
ATTORNEY Reissued Apr. 9, 1940

Re. 21,421

UNITED STATES PATENT OFFICE 21,421

HARVESTER-THRESHER

John S. Troyer, Moyock, N. C., assignor of one-half to The Massey-Harris Company, Racine, Wis., a corporation of Maryland Original No. 2,113,999, dated April 12, 1938, Serial No. 54,766, December 16, 1935. Application for reissue August 24, 1939, Serial No. 293,120

4 Claims. (Cl. 56—21)

This invention relates to agricultural machines, and in particular to agricultural machines known as combined harvesting and threshing machines.

The primary object of the invention is to provide a machine of this character which will embody all of the characteristics and advantages of the usual large and expensive harvesters and threshers now in common use. The elevating platform is provided with an endless elevator the platform being preferably hinged to the front end of the threshing unit and being substantially the same width as the threshing cylinder and having a cutter bar on the forward end of the elevator platform which is somewhat longer than the width of the elevator and having gathering means for urging the grain cut by the extra length of the cutter bar inwardly and on the elevator.

An important object of the invention is to provide a combined harvester-thresher which may be operated and controlled by one man, thereby reducing the cost of operation to a minimum.

A still further object of the invention is to pivotally mount the platform of the harvester so that the platform may be readily and easily tilted to adjust the cutter bar operating at the forward end of the platform, with respect to the ground surface and crop being harvested.

Another important object of the invention is to provide agricultural machines of this type wherein the harvester platform is mounted in direct alignment with the threshing cylinder and in front of the threshing cylinder, thereby eliminating the usual elevating canvas feeder and other complicated machinery commonly employed in harvester and thresher machines now in use.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 4 is a sectional view taken on line 4—4 of Figure 2.

Figure 5 is an enlarged sectional view through the bearing and shaft that provide the support for the harvesting platform.

Figure 6 is an enlarged sectional view through the harvester platform bearing taken at right angles to Figure 5.

Figure 1:
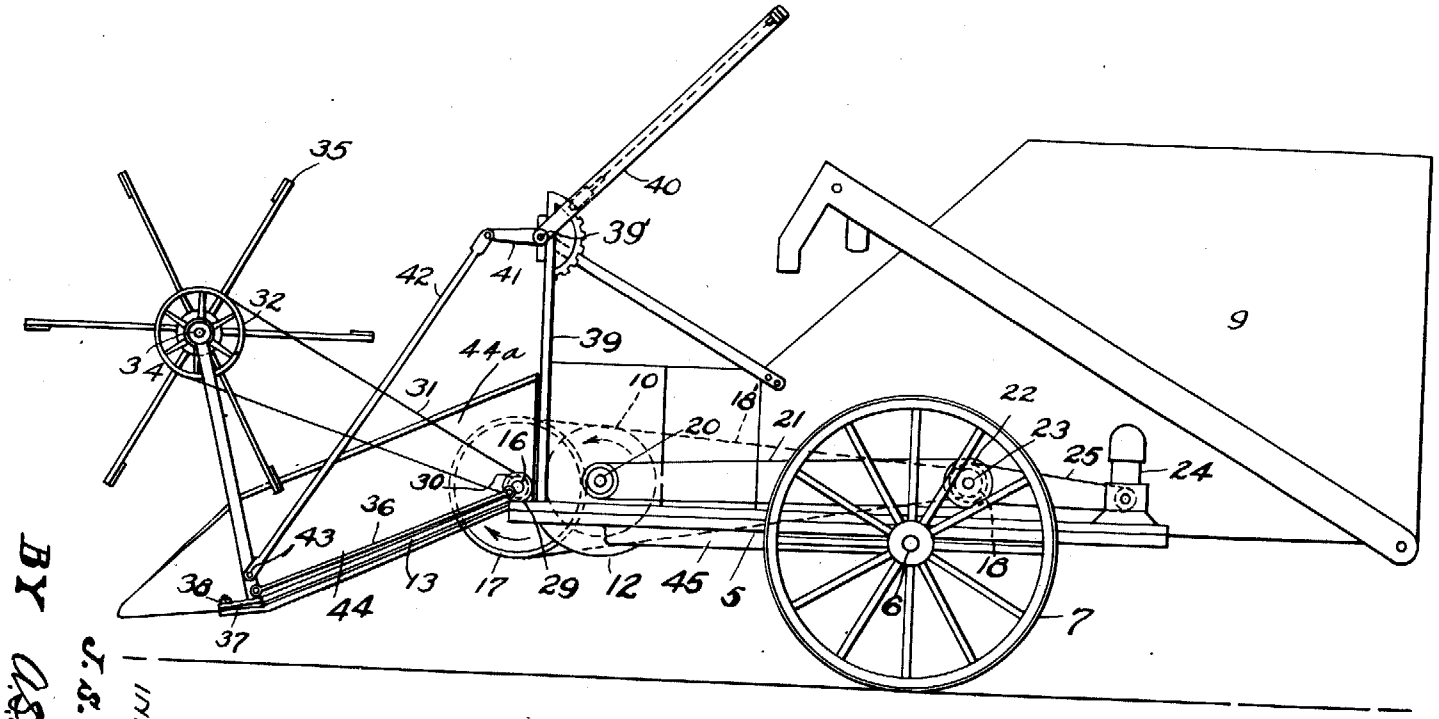
Figure 1 is a side elevational view of a machine constructed in accordance with the invention.

Referring to the drawings in detail:

The frame of the machine is indicated generally by the reference character 5, and is supported on the axle 6 on which the wheels 7 are mounted.

Mounted on the frame 5 of the machine is preferably a platform 8 which provides a support for the thresher unit 9 in which the threshing cylinder 10 and usual shaker screens of the threshing machine, are mounted.

Figure 3:
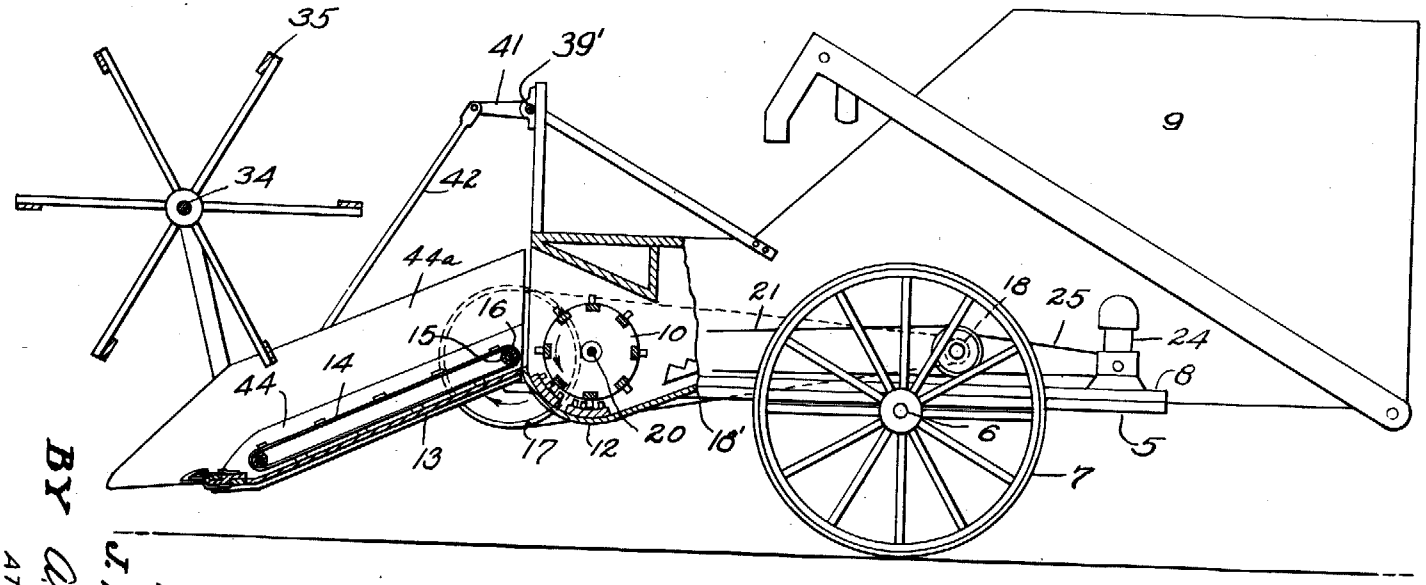
Figure 3 is a partially sectioned view taken on line 3—3 of Figure 2.

As clearly shown by Figure 3 of the drawings, the front end of the body portion 9 is curved downwardly and upwardly as at 12, the front edge being disposed adjacent the movable harvester platform 13 on which the endless conveyor belt 14 is mounted. This belt 14 operates over the roller 15 mounted on the shaft 16 which extends transversely of the thresher unit 9 and platform 13 and carries the substantially large pulley 17 at one end thereof. The reference character 18′ designates a belt which operates over the pulley 18 mounted on one end of the shaft 23. This belt 18′ also operates over the pulley 17 and transmits movement of the shaft 23 to the shaft 16 and endless conveyor belt 14.

Mounted on the opposite end of the shaft 23 is a pulley over which the belt 21 operates, the belt 21 also operating over the pulley 22, secured on the shaft 23, which in turn is operated by means of the motor 24 and belt 25.

The shaft 16 is mounted in bearings, indicated by reference character 26, disposed near opposite sides of the front end of thresher unit 9 and platform 13. Each of these bearings comprise an elongated body portion and an offset supporting section 27, the supporting sections being formed with bolt openings to receive the bolts 27′. Thus it will be seen that due to this construction, the elongated body portions of the bearings are disposed in spaced relation and they provide surfaces for the metallic straps 28′ that are connected with the outer edges of the harvesting platform 13, thereby providing not only a bearing for rotatably supporting the shaft 16, but at the same time pivotally secures platform 13 on platform 8. U-bolts 28 embrace portions of the bearings and extend through openings in the platform 8, the U-bolts contacting with the metallic straps to prevent movement of the metallic straps longitudinally of the bearings 26.

Mounted on the shaft 16 is a pulley 30 over which the belt 31 operates, the belt 31 also operating over the substantially large pulley 32 mounted on one end of the reel shaft 34 whereby the reel 35, mounted on the shaft 34 and operating at the front end of the machine, is rotated to move the grain being cut into the cutter bar of the machine.

The cutter bar is operated by means of the pitman 36, which receives its motion through the crank 29 mounted on one end of shaft 16, the pitman being connected with the bell-crank lever 37 which in turn connects with the arm 38, extending from one end of the cutter bar sickle.

Thus it will be seen that due to the construction of the bearing 26, the harvester platform and cutter bar may be raised and lowered at the will of the operator while the machine is in motion. Rising from the frame of the machine are posts 39 which posts provide a support for the shaft 39' having levers 41 mounted on the ends thereof, that are connected with the links 42 that in turn connect with the harvester platform at 43. The lever 40 is secured to the shaft 39', near one end thereof for operating the shaft 39'. As the lever 40 is operated, the harvester platform is raised or lowered and may be adjusted with respect to the ground surface, for the efficient operation of the machine.

Figure 2:
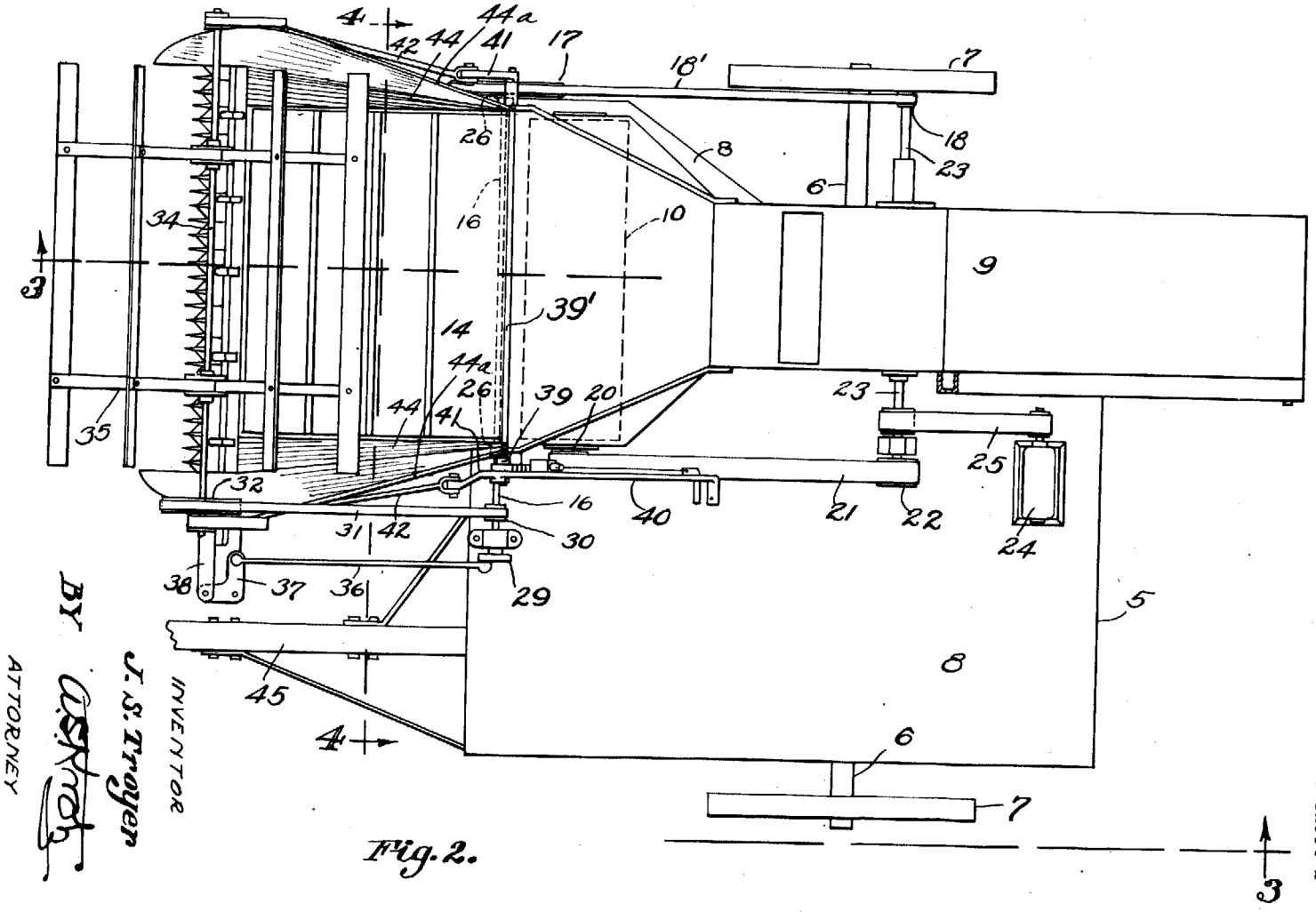
Figure 2 is a plan view thereof.

Curved guards 44 are provided at each side of the platform. The guards at their front ends register with the overhanging part of the cutter bar. That is, the ends of the part of the cutter bar which extend past the sides of the elevator 14 register with the front ends of the guards (see Figure 2). The platform at its front end is made the full length of the cutter bar and having side panels 44ª forming a trough, the side panels converging inwardly. The guards 44 occupy the space between these panels 44ª and the sides of the elevator. The edges adjacent the elevator must obviously be slightly above the plane of the top of elevator 14 so the garin that falls on the guards can move inwardly on the elevator.

It will be noted that the end panels converge to near the sides of the elevator and that the guards terminate at the same points. Therefore, all of the grain, before it reaches cylinder 10, will be moved on the elevator and since the cylinder length is about the same as the width of the elevator, the grain will be eased into the cylinder in the best condition for threshing Thus it will be seen that the grain will be urged inwardly by the platform guards as it is carried rearwardly by contact with the grain on the elevator, and it may be urged inwardly by gravity when the guards are sufficiently curved in which case the panels and guards cooperate to accomplish the best results.

The tractor hitch is indicated by the reference character 45 and affords means whereby a suitable tractor or other propelling means may be hitched to the machine.

While I have shown and described the motor 24 as the power device of the machine it is to be understood that other well known means for supplying power may be provided. I have shown the details of my device in their preferred form. Clearly many minor changes may be made without departing from the spirit and scope of my invention as recited in the appended claims.

Having thus described the invention, what is claimed is:

1. A combine harvester of the class described, comprising a wheeled supporting frame having a thresher unit mounted thereon, an elevator platform secured to the forward end of said threshing unit, an endless elevator mounted on said elevator platform, the threshing cylinder of said unit being rotatably mounted in the forward end thereof, said elevator having a width about equal to the length of said cylinder and terminating at its rear end adjacent the cylinder, a cutter bar mounted on the forward end of said elevator platform having a length somewhat greater than the width of the elevator, guards adjacent the sides of said elevator having means whereby the grain cut by the extra width of the cutter bar is urged inwardly and on said elevator before reaching said threshing cylinder.

2. A combine harvester of the class described, comprising a wheeled supporting frame having a thresher unit mounted thereon, an elevator platform secured to the forward end of said threshing unit, an endless elevator mounted on said platform, the cylinder of said threshing unit being rotatably mounted in the forward end thereof, said elevator having a width about equal to the length of said cylinder and terminating at its rear end adjacent the cylinder, a cutter bar mounted on the forward end of said elevator platform having a length somewhat greater than the width of said elevator, curved guards arising from adjacent the sides of said elevator and being adapted to urge the grain cut by the extra length of said cutter bar toward and over said elevator.

3. A combine harvester of the class described, comprising a wheeled supporting frame having a threshing unit mounted thereon, an elevator platform mounted on the forward end of said threshing unit, an endless elevator mounted on said platform, the threshing cylinder of said threshing unit being rotatably mounted in the forward end thereof, said elevator having a width equal to the length of said cylinder and terminating at its rear end adjacent the cylinder, a cutter bar mounted on the forward end of said platform having a length somewhat greater than the width of said elevator, curved guards arising from adjacent the sides of said elevator and converging to thereby deliver the material falling thereon inwardly and on said elevator.

4. A combine harvester of the class described, comprising a wheeled supporting frame, a threshing unit mounted on said frame having a grain inlet at its front end, an elevator platform hingedly mounted at its rear end to the front end of said threshing unit adjacent said grain inlet, an endless elevator mounted on said platform being adapted to deliver the grain to said inlet, a cutter bar mounted on the forward end of said platform and having a length considerably greater than the width of said endless elevator whereby said cutter bar extends past the said edge of the elevator, grain receiving and gathering means in rear of the extending end of said cutter bar and comprising a panel, a guard at the lower edge of the panel, said guard at its inner edge being positioned adjacent the edge of said elevator, the other edge of said guard and its associated panel extending rearwardly and inwardly thereby to urge the grain toward and on said elevator as it moves rearwardly, means mounted on said threshing unit having connections to the forward end of said platform whereby the front end of the platform may be raised and lowered relative to the ground.

JOHN S. TROYER.

CERTIFICATE OF CORRECTION.

Reissue No. 21,421. April 9, 1940.

JOHN S. TROYER.

It is hereby certified that error appears in the printed specification of the above numbered patent requiring correction as follows: Page 2, first column, line 42, for "garin" read --grain--; line 51, after "Threshing" insert a period; same page, second column, line 59, claim 4, for "the said edge" read --the edge--; and that the said Letters Patent should be read with this correction therein that the same may conform to the record of the case in the Patent Office.

Signed and sealed this 18th day of June, A. D. 1940.

(Seal)

Henry Van Arsdale,
Acting Commissioner of Patents.